US012380258B2

United States Patent
Kar et al.

(10) Patent No.: US 12,380,258 B2
(45) Date of Patent: Aug. 5, 2025

(54) TECHNIQUES FOR GENERATING A CONFIGURATION FOR ELECTRICALLY ISOLATING FAULT DOMAINS IN A DATA CENTER

(71) Applicant: Oracle International Corporation, Redwood Shores, CA (US)

(72) Inventors: Abhishek Kar, Chandler, AZ (US); Michael Hicks, Phoenix, AZ (US); Christopher Richard Newcombe, Kirkland, WA (US); Kenneth J. Patchett, Woodinville, WA (US)

(73) Assignee: Oracle International Corporation, Redwood Shores, CA (US)

( * ) Notice: Subject to any disclaimer, the term of this patent is extended or adjusted under 35 U.S.C. 154(b) by 983 days.

(21) Appl. No.: 17/211,670

(22) Filed: Mar. 24, 2021

(65) Prior Publication Data

US 2022/0129601 A1   Apr. 28, 2022

Related U.S. Application Data

(60) Provisional application No. 63/105,826, filed on Oct. 26, 2020.

(51) Int. Cl.
*G06F 30/20* (2020.01)
*G06F 1/26* (2006.01)
(Continued)

(52) U.S. Cl.
CPC .............. *G06F 30/20* (2020.01); *G06F 1/263* (2013.01); *G06F 1/28* (2013.01); *G06F 1/30* (2013.01);
(Continued)

(58) Field of Classification Search
CPC . G06F 30/20; G06F 1/263; G06F 1/28; G06F 1/30; G06F 11/2015; G06F 30/10;
(Continued)

(56) References Cited

U.S. PATENT DOCUMENTS

2009/0287949 A1\* 11/2009 Bradicich ............. G06F 1/3203
713/340
2015/0378408 A1   12/2015 Kaplan
(Continued)

FOREIGN PATENT DOCUMENTS

| JP | 2012-093830 A | 5/2012 |
|---|---|---|
| JP | 2017-519322 A | 7/2017 |
| JP | 2020064473 | 4/2020 |

OTHER PUBLICATIONS

International Application No. PCT/US2021/056498, International Search Report and Written Opinion mailed on Feb. 3, 2022, 14 pages.

*Primary Examiner* — John E Johansen
(74) *Attorney, Agent, or Firm* — Invoke

(57) ABSTRACT

A computer system may receive a layout of a data center, the layout of the data center identifying physical locations of a plurality of server racks, electrical distribution feeds, and uninterruptible power supplies. The computer system may receive a fault domain configuration for the datacenter, the fault domain configuration identifying virtual locations of a plurality of logical fault domains for distributing one or more instances so that the instances are stored on independent physical hardware devices within a single availability fault domain. The computer system may determine the configuration for the data center by assigning the plurality of fault domains to a plurality of electrical zones, wherein each electrical zone provides a redundant electrical power supply across the plurality of logical fault domains in an event of a failure of one or more electrical distribution feeds. The
(Continued)

computer system may display the configuration for the data center on a display.

26 Claims, 13 Drawing Sheets

(51) Int. Cl.
| | | |
|---|---|---|
| *G06F 1/28* | (2006.01) | |
| *G06F 1/30* | (2006.01) | |
| *G06F 11/20* | (2006.01) | |
| *G06F 30/10* | (2020.01) | |
| *G06F 30/18* | (2020.01) | |
| *G06F 113/02* | (2020.01) | |
| *G06F 117/02* | (2020.01) | |
| *G06F 119/02* | (2020.01) | |
| *G06F 119/06* | (2020.01) | |

(52) U.S. Cl.
CPC .......... *G06F 11/2015* (2013.01); *G06F 30/10* (2020.01); *G06F 30/18* (2020.01); *G06F 2113/02* (2020.01); *G06F 2117/02* (2020.01); *G06F 2119/02* (2020.01); *G06F 2119/06* (2020.01)

(58) Field of Classification Search
CPC .. G06F 30/18; G06F 2113/02; G06F 2117/02; G06F 2119/02; G06F 2119/06
USPC .......................................................... 703/13
See application file for complete search history.

(56) References Cited

U.S. PATENT DOCUMENTS

| | | | |
|---|---|---|---|
| 2016/0371135 A1* | 12/2016 | Sarkar | G06F 11/1425 |
| 2019/0068466 A1* | 2/2019 | Chagam Reddy | H04L 43/0876 |
| 2020/0127491 A1* | 4/2020 | Ansett | G06F 11/2015 |
| 2021/0089376 A1* | 3/2021 | Glade | G06F 11/1448 |

* cited by examiner

Failover Matrix

| Legend | |
|---|---|
| N+1 | No Impact. |
| N | Loss of Power Redundancy. No customer impact |
| 0 | Loss of Service. |

| UPS System | | Rack Number | Fault Domain | PDU |
|---|---|---|---|---|
| A | B | 1 | 1 | 1,2 |
| A | C | 2 | 1 | 2,1 |
| A | C | 3 | 2 | 3,4 |
| C | D | 4 | 2 | 4,3 |
| C | D | 5 | 3 | 5,6 |
| C | D | 6 | 4 | 6,5 |

*FIG. 4*

Appendix: Failover Matrix

| Legend | |
|---|---|
| N+1 | No Impact. |
| N | Loss of Power Redundancy. No customer impact |
| 0 | Loss of Service. |

Scenario #1: Normal State. All UPS online.

| UPS System | | Electrical Zone | Fault Domain | Block Volume |
|---|---|---|---|---|
| A | B | 1 | 1 | 1 |
| A | C | 2 | 2 | 2 |
| A | D | 3 | 3 | 3 |
| B | C | 4 | 1 | 4 |
| B | D | 5 | 2 | 1 |
| C | D | 6 | 3 | 2 |

Failure Effect: None. All systems normal operation

Scenario #2: Single Electrical Failure. UPS A offline.

| UPS System | | Electrical Zone | Fault Domain | Block Volume |
|---|---|---|---|---|
| A | B | 1 | 1 | 1 |
| A | C | 2 | 2 | 2 |
| A | D | 3 | 3 | 3 |
| B | C | 4 | 1 | 4 |
| B | D | 5 | 2 | 1 |
| C | D | 6 | 3 | 2 |

Failure Effect: Loss of power redundancy in 3 zones.

FIG. 5

Scenario #3: Dual Electrical Failure. UPS A, UPS B offline.

| UPS System | | Electrical Zone | Fault Domain | Block Volume |
|---|---|---|---|---|
| A | B | 1 | 1 | 1 |
| A | C | 2 | 2 | 2 |
| A | D | 3 | 3 | 3 |
| B | C | 4 | 1 | 4 |
| B | D | 5 | 2 | 1 |
| C | D | 6 | 3 | 2 |

Failure Effect: EZ-1 offline. Partial loss of FD+BV. Only 1 FD/BV will lose service.

Scenario #4: Dual Electrical Failure. UPS B, UPS D offline.

| UPS System | | Electrical Zone | Fault Domain | Block Volume |
|---|---|---|---|---|
| A | B | 1 | 1 | 1 |
| A | C | 2 | 2 | 2 |
| A | D | 3 | 3 | 3 |
| B | C | 4 | 1 | 4 |
| B | D | 5 | 2 | 1 |
| C | D | 6 | 3 | 2 |

Failure Effect: EZ-1 offline. Partial loss of FD+BV. Only FD/BV will lose service.

Scenario #5: Dual Electrical Failure. UPS C, UPS offline.

| UPS System | | Electrical Zone | Fault Domain | Block Volume |
|---|---|---|---|---|
| A | B | 1 | 1 | 1 |
| A | C | 2 | 2 | 2 |
| A | D | 3 | 3 | 3 |
| B | C | 4 | 1 | 4 |
| B | D | 5 | 2 | 1 |
| C | D | 6 | 3 | 2 |

Failure Effect: EZ-1 offline. Partial loss of FD+BV. Only 1 FD/BV will lose service.

*FIG. 6*

TECHNIQUES FOR GENERATING A CONFIGURATION FOR ELECTRICALLY ISOLATING FAULT DOMAINS IN A DATA CENTER

CROSS-REFERENCES TO RELATED APPLICATIONS

This application claims the benefit of U.S. Provisional Patent Application No. 63/105,826, entitled "Techniques For Generating A Configuration For Electrically Isolating Fault Domains In A Data Center," filed Oct. 26, 2020, hereby incorporated by reference in its entirety and for all purposes.

BACKGROUND

Data Centers can be organized by fault domains. A fault domain is a grouping of hardware and infrastructure within an availability domain. Fault domains provide anti-affinity by distributing customer compute instances and storage instances so that the instances are not on the same physical hardware within a single availability domain. A hardware failure or hardware maintenance event that affects one fault domain does not affect instances in other fault domains. However, these fault domains are not always electrically isolated from each other. Therefore, an electrical failure in one or more electrical sources can result in loss of fault domain redundancy or performance of the instances on the fault domains.

SUMMARY

In some implementations, a technique includes receiving a layout of a data center. The layout of the data center can identify physical locations of a plurality of server racks, a plurality of electrical distribution feeds, and a plurality of power supplies. The technique can include receiving a logical fault domain configuration for the data center. The logical fault domain configuration can identify virtual locations of a plurality of logical fault domains for distributing one or more compute instances. The compute instances can be executed on independent physical hardware devices within a single logical fault domain based at least in part on the logical fault domain configuration. The technique can include determining a data center configuration by assigning at least some of the plurality of logical fault domains to at least some of a plurality of electrical zones. Each electrical zone of the plurality of electrical zones can provide a redundant electrical power supply across the plurality of logical fault domains based at least in part on occurrence of a power failure. The technique can include transmitting the data center configuration to a device to display.

In some implementations, a non-transitory computer-readable medium storing a set of instructions includes one or more instructions that, when executed by one or more processors of a computer system, cause the computer system to perform operations. The operations can include receiving a layout of a data center. The layout of the data center can identify physical locations of a plurality of server racks, a plurality of electrical distribution feeds, and a plurality of power supplies. The operations can include receiving a logical fault domain configuration for the data center. The logical fault domain configuration can identify virtual locations of a plurality of logical fault domains for distributing one or more compute instances. The compute instances can be executed on independent physical hardware devices within a single logical fault domain based at least in part on the logical fault domain configuration. The operations can include determining a data center configuration by assigning at least some of the plurality of logical fault domains to at least some of a plurality of electrical zones. Each electrical zone of the plurality of electrical zones can provide a redundant electrical power supply across the plurality of logical fault domains based at least in part on occurrence of a power failure. The operations can include transmitting the data center configuration to a device to display.

In some implementations, a computer system includes one or more memories; and one or more processors, communicatively coupled to the one or more memories, configured to perform operations. The operations can include receiving a layout of a data center. The layout of the data center can identify physical locations of a plurality of server racks, a plurality of electrical distribution feeds, and a plurality of power supplies. The operations can include receiving a logical fault domain configuration for the data center. The logical fault domain configuration can include identifying virtual locations of a plurality of logical fault domains for distributing one or more compute instances. The compute instances can be executed on independent physical hardware devices within a single logical fault domain based at least in part on the logical fault domain configuration. The operations can include determining a data center configuration by assigning at least some of the plurality of logical fault domains to at least some of a plurality of electrical zones. Each electrical zone of the plurality of electrical zones provide a redundant electrical power supply across the plurality of logical fault domains based at least in part on occurrence of a power failure. The operations can include transmitting the data center configuration to a device to display.

These and other embodiments are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 4 illustrates a table illustrating the effects of the data center configuration illustrated in FIG. 3.

FIG. 5 illustrates a first table illustrating a Failover Matrix for a data center employing the electrical isolation techniques described above.

FIG. 6 illustrates a second table illustrating a Failover Matrix for a data center employing the electrical isolation techniques described above.

DETAILED DESCRIPTION OF THE DRAWINGS

Figure 1:
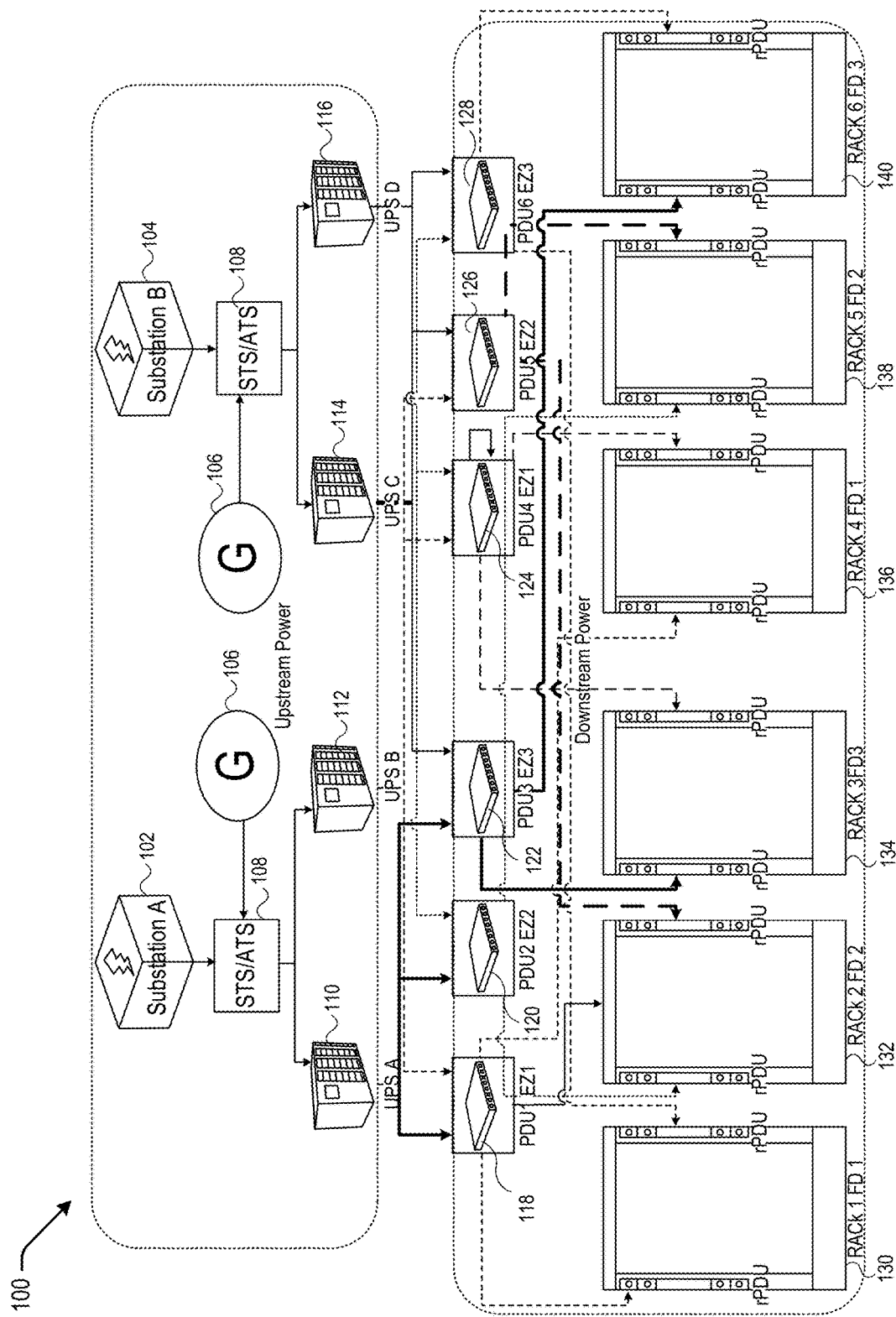
FIG. 1 illustrates a first example data center according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive.

Certain embodiments disclose techniques for determining a configuration for electrically isolating various fault domains in a data center. Data centers can provide redundancy and resiliency by distributing compute and/or storage instances over several servers as part of a logical fault domain. In this way, failure of a particular server or server rack does not render the compute and/or storage instances inoperable or unavailable. For example, if a web service is hosted on several servers across a fault domain, failure of any one server does not render the web service unavailable.

The present disclosure improves on the fault domain concept by considering electrical power sources and electrical distribution feeds to the devices in the various fault domains. For example if multiple servers in a certain fault domain are powered by the same power source, a failure of that power source or distribution feed can destroy the redundancy that the fault domain concept provides.

Techniques are disclosed that include receiving a layout of a data center. The layout of the data center can identify physical locations of a plurality of server racks, a plurality of electrical distribution feeds, and a plurality of power supplies. The technique can include receiving a logical fault domain configuration for the data center. The logical fault domain configuration can identify virtual locations of a plurality of logical fault domains for distributing one or more compute instances. The compute instances can be executed on independent physical hardware devices within a single logical fault domain based at least in part on the logical fault domain configuration. The technique can include determining a data center configuration by assigning at least some of the plurality of logical fault domains to at least some of a plurality of electrical zones. Each electrical zone of the plurality of electrical zones can provide a redundant electrical power supply across the plurality of logical fault domains based at least in part on occurrence of a power failure. The technique can include transmitting the data center configuration to a device to display.

In this way, data center configurations using the techniques described herein preserve redundancy and resiliency provided by logical fault domains even in the event of failure of one or more electrical sources or electrical feeds.

For purposes of this application, a "fault domain" is a set of hardware components (computers, switches, and more) that share a single point of failure. A compute pool can be logically divided up into fault domains. In some examples, each availability domain contains two or more fault domains. Fault domains provide anti-affinity allowing a developer to distribute instances so that the instances are not on the same physical hardware within a single availability domain. A hardware failure or hardware maintenance event that affects one fault domain does not affect instances in other fault domains.

For purposes of this application, an "instance" is a hosted server that is running either in the Customer Enclave (available publicly) or Service Enclave. If it directly accesses the hardware that it runs on, it can be considered a bare metal instance. If there is a hypervisor between the compute or storage instance, it can be considered a virtual instance.

For purposes of this application, an "electrical zone" (EZ) in the data centers is defined as a unique combination of Uninterrupted Power Supplies (UPS) supplied through the electrical infrastructure to individual racks. EZs can be established at design of the data center and are not flexible after construction. A data center may have as few as one EZ. Depending on the UPS configurations and power distribution, a site may have many fault domains. Table 1 illustrates how the number of uninterruptable power supplies result to number of electrical zones.

TABLE 1

| # of UPS | Maximum # of Electrical Zones |
| --- | --- |
| 2 | 1 |
| 4 | 6 |
| 6 | 15 |
| 8 | 28 |
| 10 | 45 |

Fault domains mapped between electrical zones increase the service reliability during an electrical event. Electrical zones will have their resiliency reduced by different degrees during planned maintenance and equipment failures. Some events remove the resiliency of a UPS and supply only utility power to racks. Other events will shut power off at different levels of the electrical infrastructure. Some shutdowns will occur during required maintenance cycles. It is important to note that the power resiliency is designed so that it will take two failures to take down a rack.

Examples of "blast radius" are in the following table. This will vary from site to site dependent upon the infrastructure design.

Table 2 illustrates the effect of various equipment outages.

TABLE 2

| Equipment | Potential rack impact (estimated) |
| --- | --- |
| Branch Circuit | 1 |
| Remote Power Panel (RPP) | 8-28 |
| Busway (single row) | 17 |
| Power Distribution Unit (PDU) | 32-96 |
| Uninterruptable Power Supply (UPS) | 100+ |

FIG. 1 illustrates a first example data center 100 according to some embodiments of the disclosure. A data center can receive electrical power from one or more substations 102, 104. The substations 102, 104 can receive electrical power from a generating source (e.g., a nuclear power plant, a conventional power plant (e.g., coil, oil, and natural gas), a hydroelectric power plant, a wind turbine power system, a solar power system, geothermal power systems) which then transmits the electrical power over high frequency power lines to a substation (e.g., substations 102, 104). A substation 102, 104 is a part of an electrical generation, transmission, and distribution system. Substations 102, 104 can transform voltage from high to low, or the reverse, or perform any of several other important functions. Between the generating station and consumer, electric power may flow through several substations at different voltage levels. A substation 102, 104 can include transformers to change voltage levels between high transmission voltages and lower distribution voltages, or at the interconnection of two different transmission voltages.

The data center may have one or more back-up power source 106 (e.g., generators) that provide power to the substation in the event of loss of power from the utility grid.

The electrical power from the substations 102, 104 or the back-up power sources 106 can be routed to a switch 108. The switch 108 can include static transfer systems (STS). STS are intelligent switches providing increased supply availability, automatically transferring loads to alternative power sources when the primary power source fails or is not available. The switch 108 can also include an automatic transfer switch (ATS). An ATS is a device that transfers a power supply from its primary source automatically to a backup generator when it senses a failure or outage occurring in the primary source until utility power is restored.

From the switches, the power is routed to various power supply devices (e.g., uninterruptible power supply (UPS) devices) 110, 112, 114, 116. A UPS 110, 112, 114, 116 is an electrical apparatus that provides emergency power to a load when the input power source or main power fails. A UPS 110, 112, 114, 116 differs from an auxiliary or standby generator in that it will provide near-instantaneous protection from input power interruptions, by supplying energy stored in batteries, super capacitors, or flywheels. The on-battery run-time of most uninterruptible power sources can be relatively short (only a few minutes) but sufficient to start a standby power source or properly shut down the protected equipment.

A UPS is typically used to protect hardware such as computers, data centers, telecommunication equipment or other electrical equipment where an unexpected power disruption could cause injuries, fatalities, serious business disruption or data loss. UPS units range in size from units designed to protect a single computer without a video monitor (around 200 volt-ampere rating) to large units powering entire data centers or buildings.

The UPS 110, 112, 114, 116 provide electrical power to one or more power distribution units (PDUs) 118, 120, 122, 124, 126, and 128. A PDU is a device fitted with multiple outputs designed to distribute electric power, especially to racks of computers and networking equipment located within a data center. Data centers face challenges in power protection and management solutions. This is why many data centers rely on PDU monitoring to improve efficiency, uptime, and growth. For data center applications, the power requirement is typically much larger than a home or office style power strips with power inputs as large as 22 kilovolt-amps (kVA) or even greater. Most large data centers utilize PDUs with 3-phase power input and 1-phase power output. There are two main categories of PDUs: Basic PDUs and Intelligent (networked) PDUs or iPDUs. Basic PDUs simply provide a means of distributing power from the input to a plurality of outlets. Intelligent PDUs normally have an intelligence module which allow the PDU for remote management of power metering information, power outlet on/off control, and/or alarms. Some advanced PDUs allow users to manage external sensors such as temperature, humidity, airflow, etc.

The PDUs 118, 120, 122, 124, 126, and 128 can transfer the electrical power to rack PDUs. The rack PDUs transfer the electrical power to the individual electronic modules such as data servers. The role of a server is to share data as well as to share resources and distribute work. A server computer can serve its own computer programs as well.

Each of the electrical racks receives redundant electrical power supplies. For example, each of the UPS 110, 112, 114, and 116 can either receive power from the substations 102, 104 or from the back-up power source 106. Each of the PDUs can receive power from multiple UPS. For example, PDU1 118 can receive power from UPS A 110 and UPS B. Each of the racks can receive electrical power from multiple PDUs. For example, Rack1 139 receives electrical power from PDU1 118 and PDU6 128. This redundancy allows for electrical power to the server devices without any single point of failure vulnerability.

Each of the electrical racks can be divided into multiple fault domains. For example, Rack1 130 and Rack4 136 are on Fault Domain 1. Rack2 132 and Rack5 138 are on Fault Domain 2 and Rack3 134 and Rack6 140 are on Fault Domain 3. In this way, a customer instance (e.g., a web service) can be propagated across the three Fault Domains. Therefore, issues with one or more Racks within one Fault Domain will not impact service on the other Fault Domains.

Figure 2:
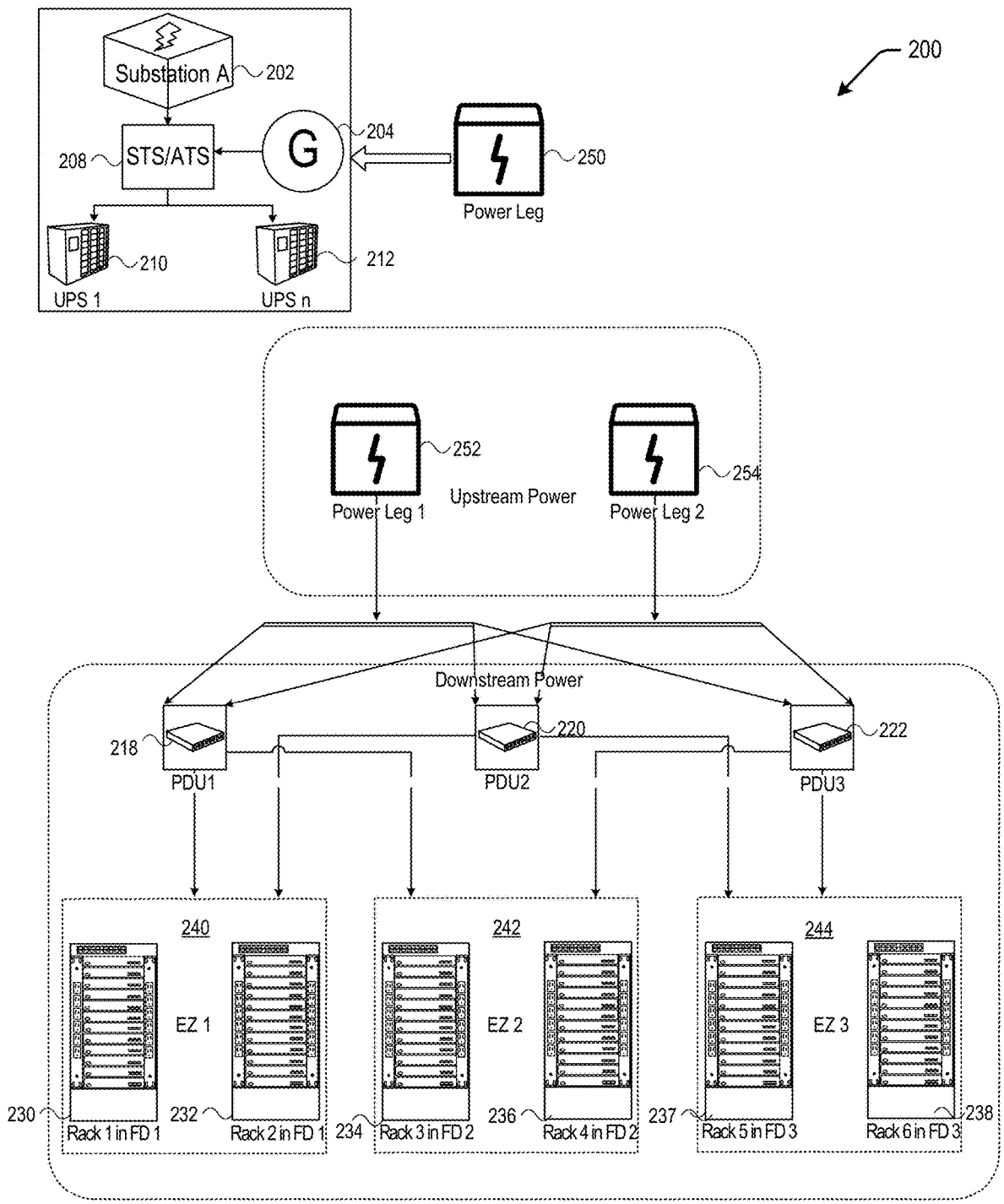
FIG. 2 illustrates a second example data center according to embodiments of the disclosure.

FIG. 2 illustrates an improved data center 200 according to embodiments of the disclosure. While having many of the same components of the data center 100, the improved data center 200 introduces electrical zones 240, 242, and 244

As shown in FIG. 2, the data center 200 has two power legs 252, 254. The power leg 252, 254 can include a substation 202, a back-up power supply 204, and UPS 210, 212 as described above with reference to data center 100. The substation 202 and the back-up power supply can feed into a switch 208. The switch 208 can be a static transfer switch (STS) or an automatic transfer switch (ATS). A static transfer switch uses power semiconductors such as Silicon-controlled rectifiers (SCRs) to transfer a load between two sources. Because there are no mechanical moving parts, the transfer can be completed rapidly, perhaps within a quarter-cycle of the power frequency. Static transfer switches can be used where reliable and independent sources of power are available, and it is necessary to protect the load from even a few power frequency cycles interruption time, or from any surges or sags in the prime power source. An Automatic Transfer Switch (ATS) is often installed where a backup generator is located, so that the generator may provide temporary electrical power if the utility source fails.

FIG. 2 illustrates two power legs 250. The power legs 250 provide electrical power to three PDUs 218, 220, and 222. Each of the PDUs 218, 220, and 222 provides power to multiple racks by electrical zone. For example, Electrical Zone1 240 includes Rack1 230 and Rack2 232, both of which are in Fault Domain 1. Electrical Zone1 240 receives electrical power from both PDU1 218 and PDU2 220.

Electrical Zone2 242 includes Rack2 234 and Rack4 236, both of which are in Fault Domain 2. Electrical Zone2 242 receives electrical power from both PDU1 218 and PDU3 222.

Electrical Zone3 244 includes Rack5 237 and Rack6 238, both of which are in Fault Domain 3. Electrical Zone3 244 receives electrical power from both PDU1 218 and PDU3 238.

The configuration shown in FIG. 2 allows for both fault isolation and electrical isolation. For example, a customer can store instances across the three fault domains (e.g., Fault Domain 1, Fault Domain 2, and Fault Domain 3). Loss of any one of the PDUs 218, 220, and 222 will still provide fault domain redundancy due to the electrical isolation. For example, if instances are stored on Rack1 230 (Fault Domain 1), Rack3 234 (Fault Domain 2), and Rack5 237 (Fault Domain 3). If PDU 218 fails, Rack1 230 receives power from PDU2 220, Rack3 receives power from PDU3 222, and Rack5 receives power from PDU2 220 and PDU3 222. Therefore, in the event of a single PDU failure, the fault domain redundancy is preserved.

Figure 3:
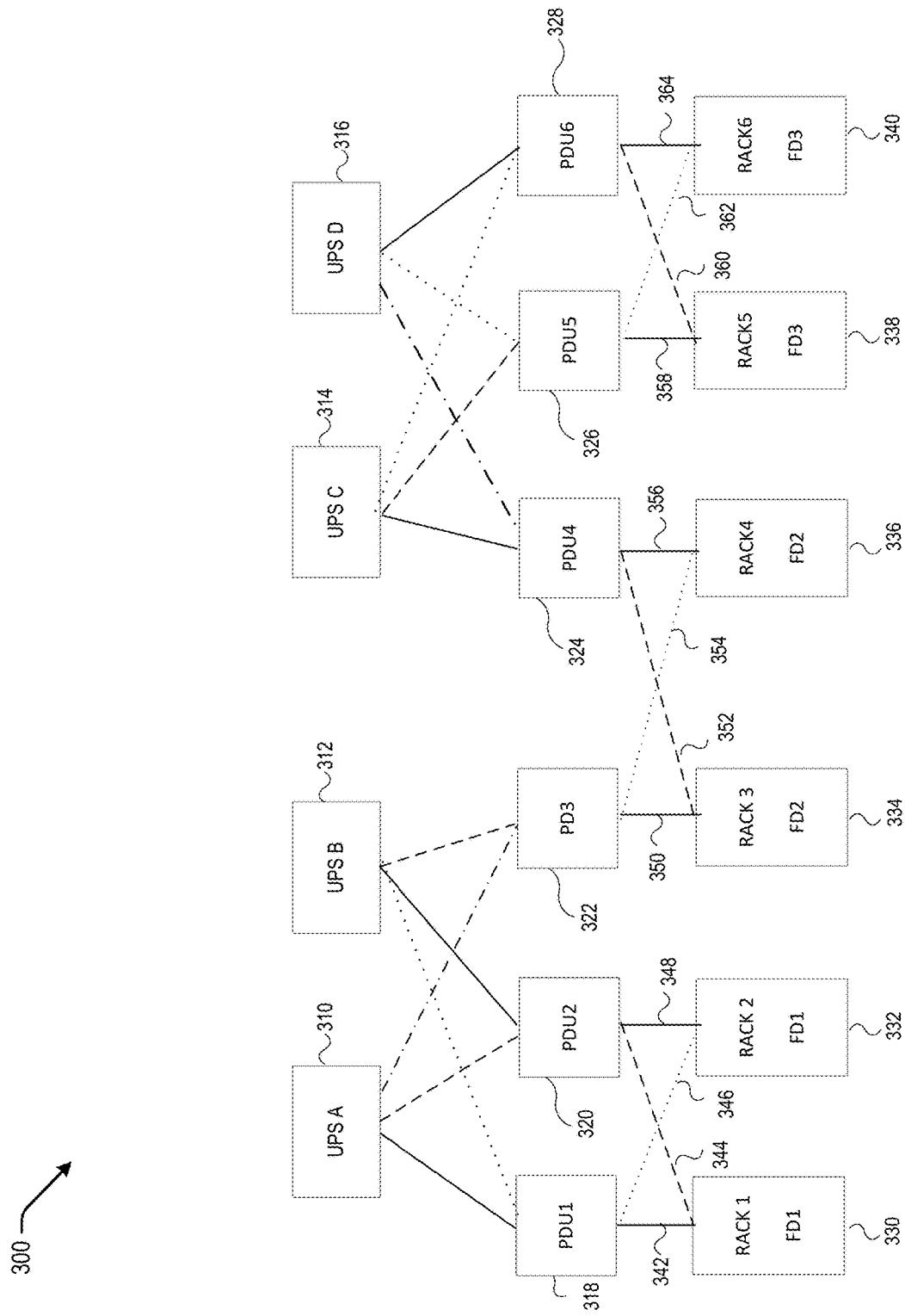
FIG. 3 illustrates an example data center not employing the electrical isolation techniques described above in accordance with embodiments of the disclosure.

FIG. 3 illustrates an example data center 300 not employing the electrical isolation techniques described above. For example, each of the UPS A 310, UPS B 312, UPS C 314, UPS D 316 provides redundant electrical power to PDU1 318, PDU2 320, PDU3 322, PDU4 324, PDU5 326, and PDU6 328 as shown in FIG. 3. In turn, PDU1 318, PDU2 320, PDU3 322, PDU4 324, PDU5 326, and PDU6 328 provide electrical power to Rack1 330, Rack2 332, Rack3, 334 Rack4 336, Rack5 338 and Rack6 340. In the data center 300 configuration shown in FIG. 3 the concept of electrical isolation is not employed. PDU1 318 provides primary power via line 342 to Rack1 330 and secondary power via line 346 to Rack2 332. PDU2 320 provides primary power via line 348 to Rack2 332 and secondary power via line 344 to Rack1 330. PDU3 322 provides primary power via line 350 to Rack3 334 and secondary power via line 354 to Rack4 336. PDU4 324 provides primary power via line 356 to Rack4 336 and secondary power via line 352 to Rack3 334. PDU5 326 provides primary power via line 358 to Rack5 338 and secondary power via line 362 to Rack6 340. PDU6 provides primary power via line 364 to Rack6 340 and secondary power via line 366 to Rack5 338. In that way, every rack has a duplicate power source.

FIG. 4 illustrates a table illustrating the effects of the data center configuration 300 illustrated in FIG. 3. If there is a dual electrical failure, such as UPS A 310 and UPS B 312 failing, the results Rack1 330 and Rack2 332 are offline. As these racks provide redundancy for the Fault Domain 1, if both UPS A 310 and UPS B 312 fail, the instances stored in Fault Domain 1 would be lost with the failure of UPS A and UPS B. Rack3 334 will also lose redundancy in the power supply.

FIG. 5 illustrates a first table illustrating a Failover Matrix for a data center employing the electrical isolation techniques described above. The data center includes UPS A, UPS B, UPS C, and UPS D. Electrical Zone 1 receives power from UPS A and UPS B. Electrical Zone 2 receives power from UPS A and UPS C. Electrical Zone 3 receives power from UPS A and UPS D. Electrical Zone 4 receives power from UPS B and UPS C. Electrical Zone 5 receives power from UPS B and UPS D. Electrical Zone 1 receives power from UPS C and UPS D. Fault Domain 1, Fault Domain 2, and Fault Domain 3 are spread between Electrical Zone 1, Electrical Zone 2, and Electrical Zone 3. Scenario 1 illustrates Normal State where all UPS are online. As a result, there is no failure effect and all systems have normal operation.

FIG. 5 also illustrates assigned block volume. A block volume is a type of data storage that is more expansive than file storage. Block volumes use Internet Small Computer Systems Interface (iSCSI) Ethernet protocol to deliver the features and performance similar to on-premises storage area networks (SANs), and are designed for the security and durability of the data life cycle. Block Volumes provide customers reliable, high-performance block storage designed to work with a range of virtual machines and bare metal instances. With built-in redundancy, Block Volumes are persistent and durable beyond the lifespan of a virtual machine and can scale to 1 Pico byte per compute instance. Block Volumes use advanced, low-latency Non-Volatile Memory Express (NVMe) solid state drives (SSDs) and non-blocking network connectivity for every host, which provides high Input/output operations per second (IOPS) to Oracle compute services.

In Scenario 2, there is a single UPS electrical failure with UPS AN offline. Note Offline can be a system failure or if the UPS is purposely taken offline due to maintenance. The failure effect for Scenario 2 is a loss of power redundancy in three zones (e.g., specifically Electrical Zone 1, Electrical Zone 2, and Electrical Zone 3). However each of Electrical Zone 1, Electrical Zone 2, and Electrical Zone 3 can receive power from alternate sources. For example, Electrical Zone 1 receives power from UPS B. Electrical Zone 2 receives power from UPS C and Electrical Zone 3 receives power from UPS D. Electrical Zones 4-6 are unaffected. Therefore, none of the instances will be affected.

FIG. 6 illustrates a second table illustrating a Failover Matrix for a data center employing the electrical isolation techniques described above. In Scenario 3, there is a dual electrical failure as UPS A and UPS B are offline. As illustrated in FIG. 6, Electrical Zone 1 is offline because UPS A and UPS B are both offline. However, the instances stored in servers supported by Electrical Zone 1 in Fault Domain 1 and duplicated across Electrical Zone 4. Electrical Zone 4 loses power redundancy because UPS B is offline but UPS C is online. In Scenario 3, the failure effect is that Electrical Zone 1 is offline; there is a partial loss of Fault Domain 1 and Block Volume 1. In Scenario 3 only 1 Fault Domain and Block Volume will lose service.

In Scenario 4, there is a dual electrical failure as UPS B and UPS D are offline. As illustrated in FIG. 6, Electrical Zone 5 is offline because UPS B and UPS D are both offline. However, the instances stored in servers supported by Electrical Zone 5 in Fault Domain 1 are duplicated across Electrical Zone 2. Electrical Zones 1, 3, 4, and 6 lose power redundancy because UPS B is offline and UPS D is online. In Scenario 3, the failure effect is that Electrical Zone 5 is offline; there is a partial loss of Fault Domain 2 and Block Volume 1. In Scenario 4, only 1 Fault Domain and Block Volume will lose service.

In Scenario 5 there is a dual electrical failure as UPS C and UPS D are offline. As illustrated in FIG. 6, Electrical Zone 6 is offline because UPS C and UPS D are both offline. However, the instances stored in servers supported by Electrical Zone 6 in Fault Domain 3 are duplicated across Electrical Zone 3. Electrical Zones 2, 3, 4, and 5 lose power redundancy because UPS C and UPS D are offline. In Scenario 3, the failure effect is that Electrical Zone 6 is offline; there is a partial loss of Fault Domain 3 and Block Volume 2. In Scenario 5 only 1 Fault Domain and Block Volume will lose service.

Figure 7:
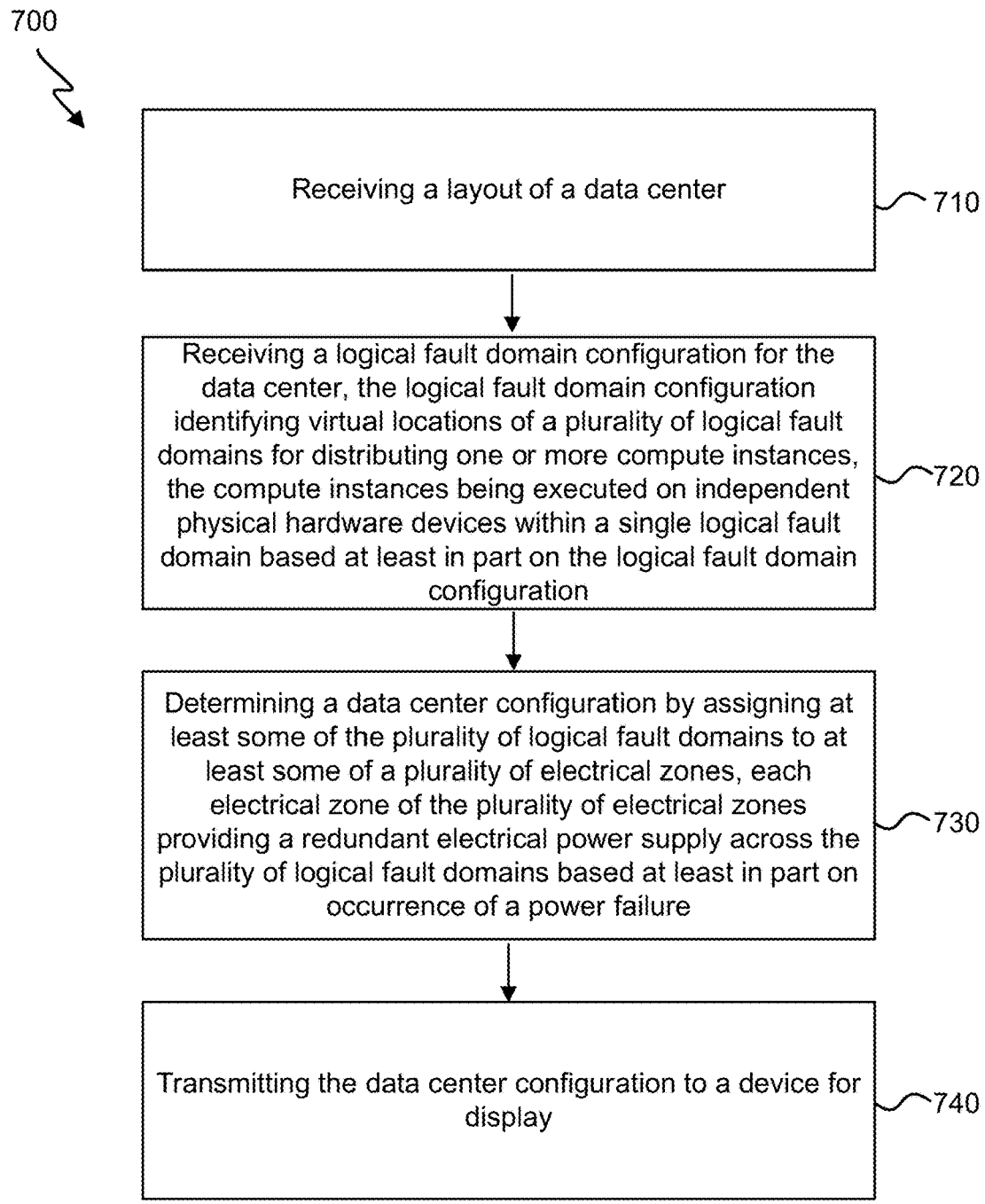
FIG. 7 is a flowchart of an example process 700 associated with techniques for generating a configuration for electrically isolating fault domains in a data center.

FIG. 7 is a flowchart of an example process 700 associated with techniques for generating a configuration for electrically isolating fault domains in a data center. In some implementations, one or more process blocks of FIG. 7 may be performed by a computer system (e.g., computer system 1300 shown in FIG. 13). In some implementations, one or more process blocks of FIG. 7 may be performed by another device or a group of devices separate from or including the computer system. Additionally, or alternatively, one or more process blocks of FIG. 7 may be performed by one or more components of computer system 1300, such as processing unit 1304, memory 1310, storage subsystem 1318, input/output subsystem 1308, bus 1302, and/or communications subsystem 1324.

As shown in FIG. 7, process 700 may include receiving a layout of a data center. The layout of the data center can identify physical locations of a plurality of server racks, a plurality of electrical distribution feeds, and a plurality of power supplies (block 710). For example, the computer system may receive a layout of a data center, the layout of the data center identifying physical locations of a plurality of server racks, a plurality of electrical distribution feeds, and a plurality of power supplies, as described above.

As further shown in FIG. 7, process 700 may include receiving a logical fault domain configuration for the data center, the logical fault domain configuration identifying virtual locations of a plurality of logical fault domains for distributing one or more compute instances, the compute instances being executed on independent physical hardware devices within a single logical fault domain based at least in part on the logical fault domain configuration (block 720). For example, the computer system may receive a logical fault domain configuration for the data center, the logical fault domain configuration identifying virtual locations of a plurality of logical fault domains for distributing one or more compute instances, the compute instances being executed on independent physical hardware devices within a single logical fault domain based at least in part on the logical fault domain configuration, as described above.

As further shown in FIG. 7, process 700 may include determining a data center configuration by assigning at least some of the plurality of logical fault domains to at least some of a plurality of electrical zones, each electrical zone of the plurality of electrical zones providing a redundant electrical power supply across the plurality of logical fault domains based at least in part on occurrence of a power failure (block 730). For example, the computer system may determine a data center configuration by assigning at least some of the plurality of logical fault domains to at least some of a plurality of electrical zones, each electrical zone of the plurality of electrical zones providing a redundant electrical power supply across the plurality of logical fault domains based at least in part on occurrence of a power failure, as described above.

The values for Electrical zone will be a number; the combination of redundant number of "Electrical zones" will vary site to site. Mathematically, the number of combinations can be represented by the following equation:

$$C(n, r) = n! \, (n - r)! r!,$$

where n is a number of power legs and r is a number of branch circuit required per rack.

For a data center with 4 separate UPS output feeder circuits (generically labeled A,B,C,D), this represents 6 unique combinations of "Electrical zones" for racks which require 2 branch circuits. The following matrix in Table 3 below can be used to determine and assign fault domain:

TABLE 3

| Power Leg Combination | Electrical zone |
|---|---|
| A + B | 1 |
| A + C | 2 |
| A + D | 3 |
| B + C | 4 |

TABLE 3-continued

| Power Leg Combination | Electrical zone |
|---|---|
| B + D | 5 |
| C + D | 6 |
| . . . | n + 1 |

Note: The total number of electrical zones within each availability domain (AD) will vary site to site. AD is one of three types of data centers: AD, point of presence (POP), and inline amplifier (ILA). Because ADs are physically isolated from one another and do not share resources (e.g., power, cooling, etc.), ADs do not have correlated failure modes. A region is comprised of one or more ADs. Within a region, all the member ADs are interconnected with a low latency, high bandwidth network.

The total number will be dependent on the number and configuration of UPS systems. This is less a function of tier-rating and more related to quantity and size of UPS. For example, a highly distributed data center may have upwards of 6 UPS systems for 1 suite. This would present up to 15 unique electrical zones in a single data center as shown in Table 4 below.

TABLE 4

| # of UPS | Maximum # of Electrical Zones |
|---|---|
| 2 | 1 |
| 4 | 6 |
| 6 | 15 |
| 8 | 28 |
| 10 | 45 |

Additionally, service teams can adjust their provisioning process to query storekeeper location data to determine the Electrical zone (and the respective Compute Fault Domain). These instance label values will be inherited from Storekeeper. Once instance and fault domains are associated, no further modifications to provisioning are anticipated as shown in Table 5.

TABLE 5

| Power Leg Combination | Electrical zone | Compute Fault Domain | Block Volume |
|---|---|---|---|
| A + B | 1 | FAULT_DOMAIN_1 | 1 |
| A + C | 2 | FAULT_DOMAIN_2 | 2 |
| A + D | 3 | FAULT_DOMAIN_3 | 3 |
| B + C | 4 | FAULT_DOMAIN_1 | 4 |
| B + D | 5 | FAULT_DOMAIN_2 | 1 |
| C + D | 6 | FAULT_DOMAIN_3 | 2 |

The disclosed techniques will leverage the capacity metrics that are published to Data Warehouse. For each selected incoming platform type, the disclosed techniques will query the data warehouse to determine which fault domain capacity pool has the fewest available instances. The disclosed techniques will then make the rack location assignment so that capacity will be provisioned where it is needed.

Instances requiring re-provision or re-pooling will be required to be relabeled if Fault Domain labels are lost during HOst Provisioning System (HOPS) re-provisioning.

More layers of complexity are introduced with Oracle Cloud Infrastructure's current footprint of multiple data center rooms within the same building shell. This introduces situations where multiple rooms may share components of critical infrastructure. For this reason, the disclosed techniques must be able to determine if a given Electrical zone is unique to the room or shared within the building. Each Storekeeper location entry will also include the following objects:

| ELECTRICAL_POWER_ZONE | DESCRIP-TION | BUILDING/ROOM LEVEL |
|---|---|---|
| 1 | "JA1" + "JB1" | [Building or Room] |

As further shown in FIG. 7, process 700 may include transmitting the data center configuration to a device to display (block 740). For example, the computer system may transmit the data center configuration to a device to display, as described above.

Process 700 may include additional implementations, such as any single implementation or any combination of implementations described below and/or in connection with one or more other processes described elsewhere herein.

In a first implementation, the data center configuration is determined by dividing an electrical power supply for the data center into equal, distinct sets of power distribution groups.

In a second implementation, alone or in combination with the first implementation, the data center configuration can include a configure where each set of the power distribution groups has N non-shared electrical paths upstream in the data center from a rack for a logical fault domain to a utility line, wherein N matches a data center redundancy property.

In a third implementation, alone or in combination with one or more of the first and second implementations, the data center configuration allows for performance of physical facility maintenance in one electrical zone without impacting other electrical zones while maintaining logical fault domain redundancies.

In a fourth implementation, alone or in combination with one or more of the first through third implementations, the data center configuration allows for power equipment failures in one electrical zone without impacting other electrical zones while maintaining logical fault domain redundancies.

In a fifth implementation, alone or in combination with one or more of the first through fourth implementations, physical hardware in a logical fault domain has independent and redundant power supply.

In a sixth implementation, alone or in combination with one or more of the first through fifth implementations, an electrical zone comprises a grouping of rack positions in the data center whose upstream electrical distribution is supplied by a unique combination of two active electrical feeds.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
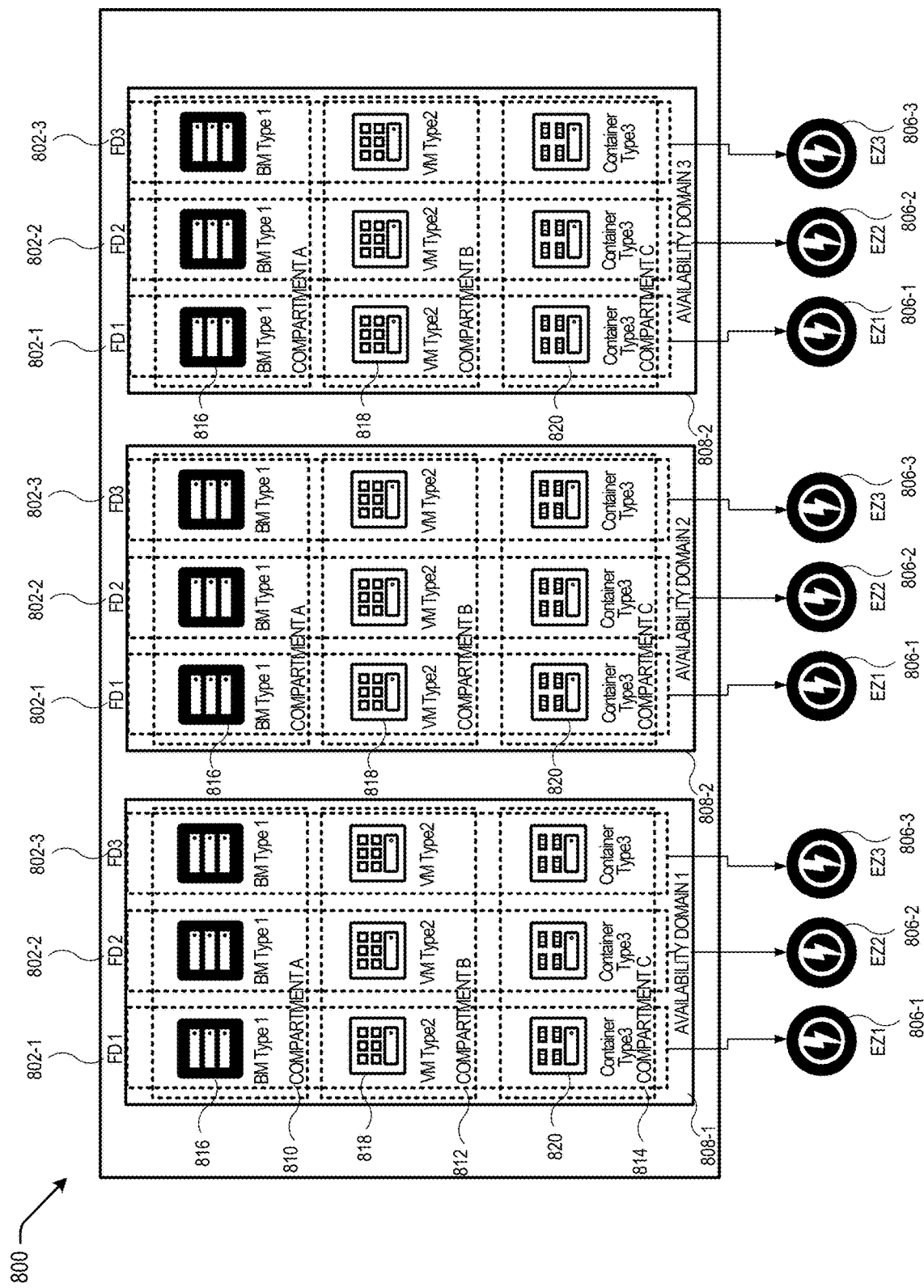
FIG. 8 is a block diagram of a data center, according to at least one embodiment.
Figure 10:
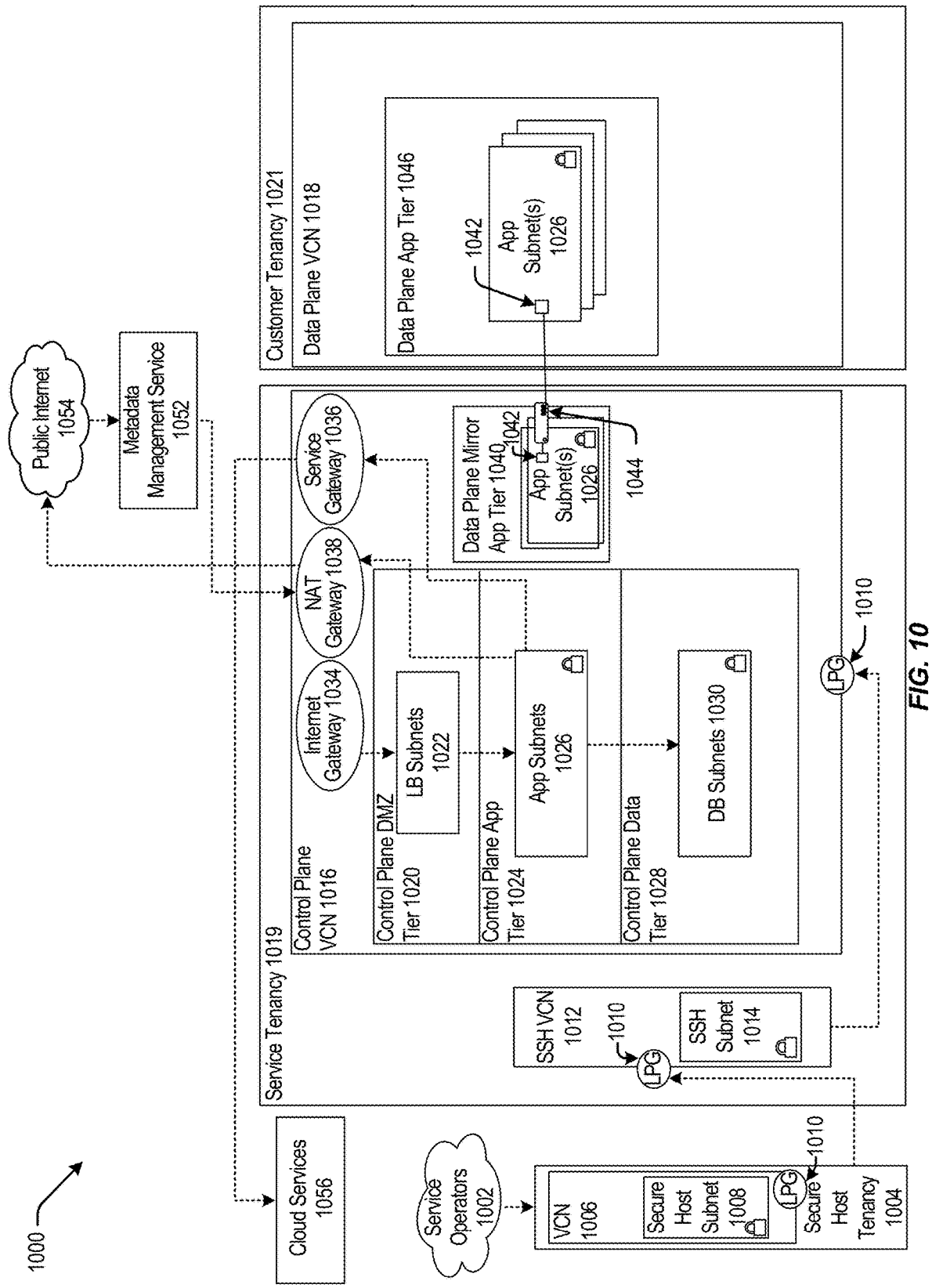
FIG. 10 is a block diagram illustrating another pattern for implementing a cloud infrastructure as a service system, according to at least one embodiment.
Figure 11:
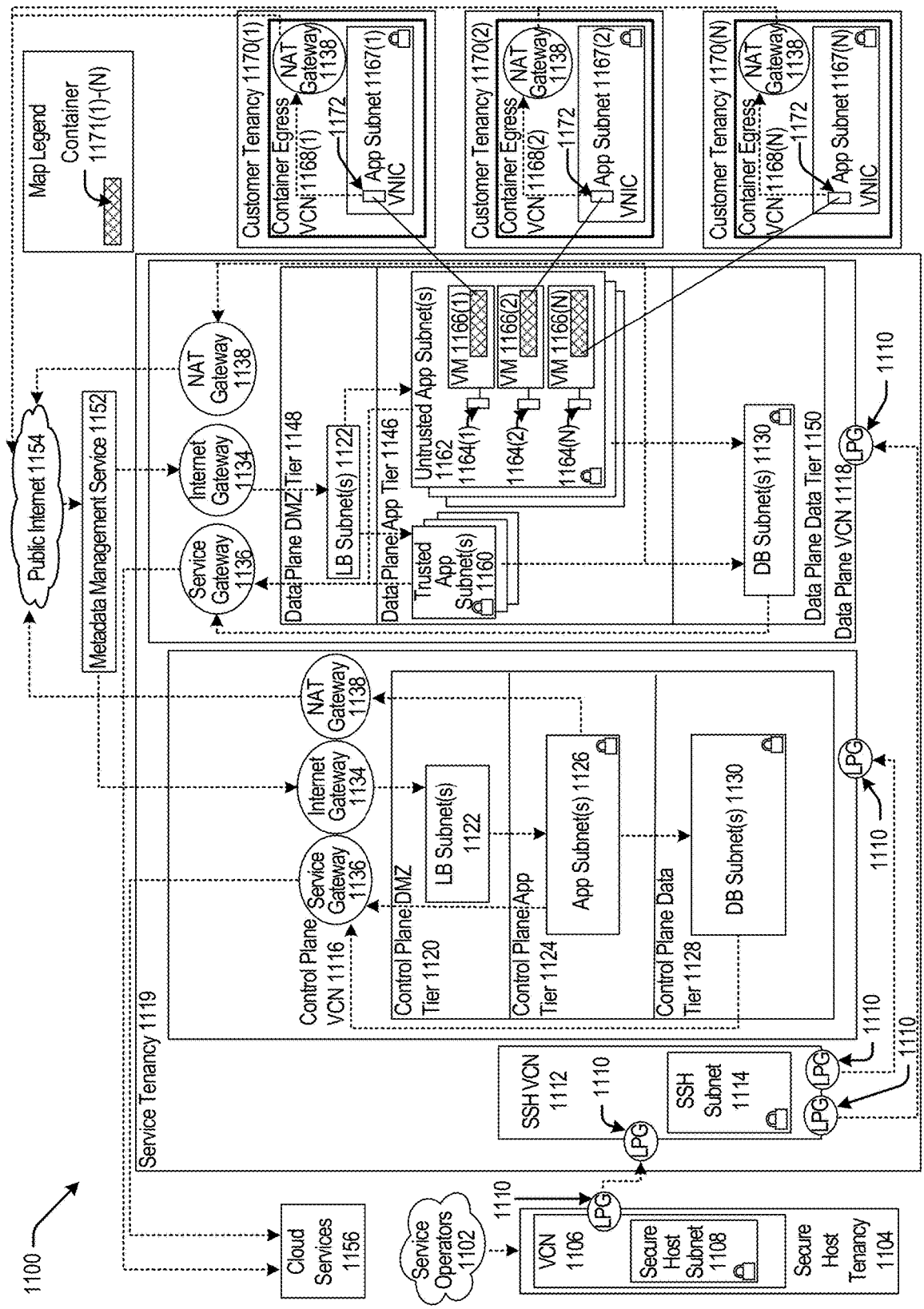
FIG. 11 is a block diagram illustrating another pattern for implementing a cloud infrastructure as a service system, according to at least one embodiment.

FIG. 8 is a block diagram of a data center, according to at least one embodiment. FIGS. 10 and 11 illustrate Untrusted App Subnet(s) 1062, 1162 with VMs 1066(1), (2), and (n), 11662(1), (2), and (n). FIG. 8 illustrates the VMs 802 in the context of a fault domain 804 and electrical zones 806.

FIG. 8 illustrates three availability domains 808-1, 808-2, and 808-3. Cloud infrastructure can be hosted in regions and availability domains. A region is a localized geographic area, and an availability domain is one or more data centers located within a region. Availability domains are isolated from each other, fault tolerant, and very unlikely to fail simultaneously.

Each availability domain 808 can include one or more compartments that can include Compartment A 810, Compartment B 812, and Compartment C 814. Compartment A 810 can include a plurality of Bare Metal (BM) type 1 machines 816. The number and configuration of the data center 800, including the number and configuration of the various compartments, are for illustration purposes only and are not ones of limitation. Bare metal machines 816 enable customers to run high performance, latency-sensitive, specialized, and traditional workloads directly on dedicated server hardware—just as they would on-premises. Bare metal machines 816 are ideal for workloads that need to run in non-virtualized environments. Bare metal machines 816 can be managed within a secure virtual cloud network (VCN), where customers get security, isolation, and governance features by default. Networking is readily extended to access any adjacent cloud infrastructure service. Bare metal machines 816 provide customers with isolation, visibility, and control with a dedicated server. The bare metal machines 816 can support applications that require high core counts, large amounts of memory, and high bandwidth—scaling up to 128 cores (the largest in the industry), 2 TB of RAM, and up to 1 PB of block storage.

Compartment B can include a plurality of virtual machines 818. A virtual machine (VM) 818 is an emulation of a computer system. Virtual machines 818 can be based on computer architectures and provide functionality of a physical computer. Virtual machine 818 implementations may involve specialized hardware, software, or a combination.

Compartment C can include one or more containers as described for Container 1071(1)-(N) in FIG. 10 above. Containers 820 can store data as discussed above.

FIG. 8 illustrates how each of the BM Machines 816, VMs 818 and Containers 820 can be organized by fault domains 802 and in various electrical zones 806. In this way, the data center 800 provides redundancy both across fault domains 802 and across electrical zones 806.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
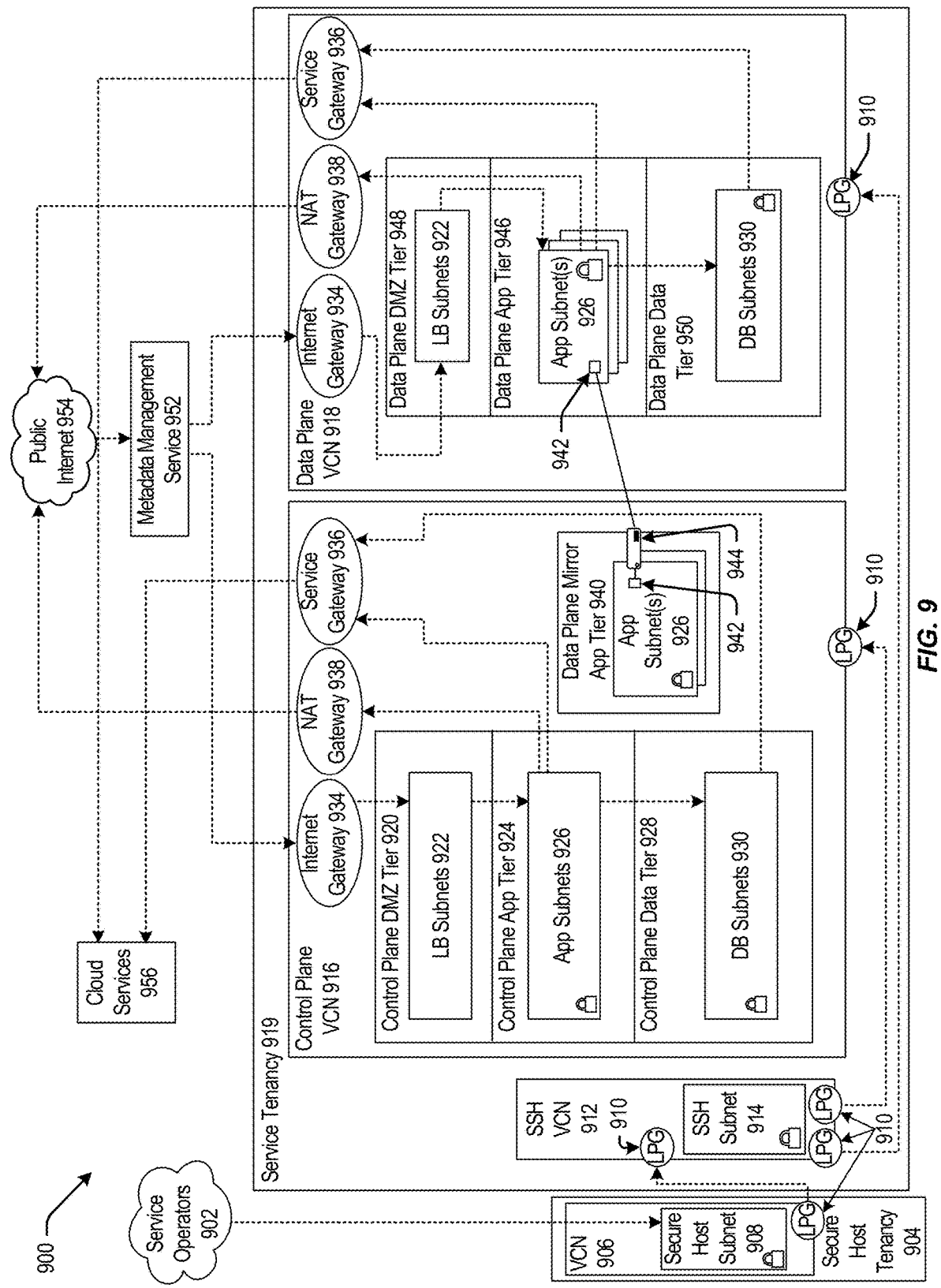
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep security breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively coupled to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of security, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g. the LPG 910 of FIG. 9) that can be communicatively coupled to a secure shell (SSH) VCN 1012 (e.g. the SSH VCN 912 of FIG. 9) via an LPG 910 contained in the SSH VCN 1012. The SSH VCN 1012 can include an SSH subnet 1014 (e.g. the SSH subnet 914 of FIG. 9), and the SSH VCN 1012 can be communicatively coupled to a control plane VCN 1016 (e.g. the control plane VCN 916 of FIG. 9) via an LPG 1010 contained in the control plane VCN 1016. The control plane VCN 1016 can be contained in a service tenancy 1019 (e.g. the service tenancy 919 of FIG. 9), and the data plane VCN 1018 (e.g. the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s)

1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g. the data plane mirror app tier 940 of FIG. 9) that can include app subnet(s) 1026. The app subnet(s) 1026 contained in the data plane mirror app tier 1040 can include a virtual network interface controller (VNIC) 1042 (e.g. the VNIC of 942) that can execute a compute instance 1044 (e.g. similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g. the metadata management service 952 of FIG. 9) that can be communicatively coupled to public Internet 1054 (e.g. public Internet 954 of FIG. 9). Public Internet 1054 can be communicatively coupled to the NAT gateway 1038 contained in the control plane VCN 1016. The service gateway 1036 contained in the control plane VCN 1016 can be communicatively coupled to cloud services 1056 (e.g. cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 8," may be located in Region 1 and in "Region 2." If a call to Deployment 8 is made by the service gateway 1036 contained in the control plane VCN 1016 located in Region 1, the call may be transmitted to Deployment 8 in Region 1. In this example, the control plane VCN 1016, or Deployment 8 in Region 1, may not be communicatively coupled to, or otherwise in communication with, Deployment 8 in Region 2.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g. the LPG 910 of FIG. 9) that can be communicatively coupled to an SSH VCN 1112 (e.g. the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g. the data plane 918 of FIG. 9) via an LPG 1110 contained in the data plane VCN 1118. The control plane VCN 1116 and the data plane VCN 1118 can be contained in a service tenancy 1119 (e.g. the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124

(e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g. the data plane app tier 946 of FIG. 9), a data plane DMZ tier 1148 (e.g. the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g. public Internet 954 of FIG. 9).

The Internet gateway 1134 contained in the control plane VCN 1116 and contained in the data plane VCN 1118 can be communicatively coupled to a metadata management service 1152 (e.g. the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some embodiments, the data plane VCN 1118 can be integrated with customer tenancies 1170. This integration can be useful or desirable for customers of the IaaS provider in some cases such as a case that may require support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
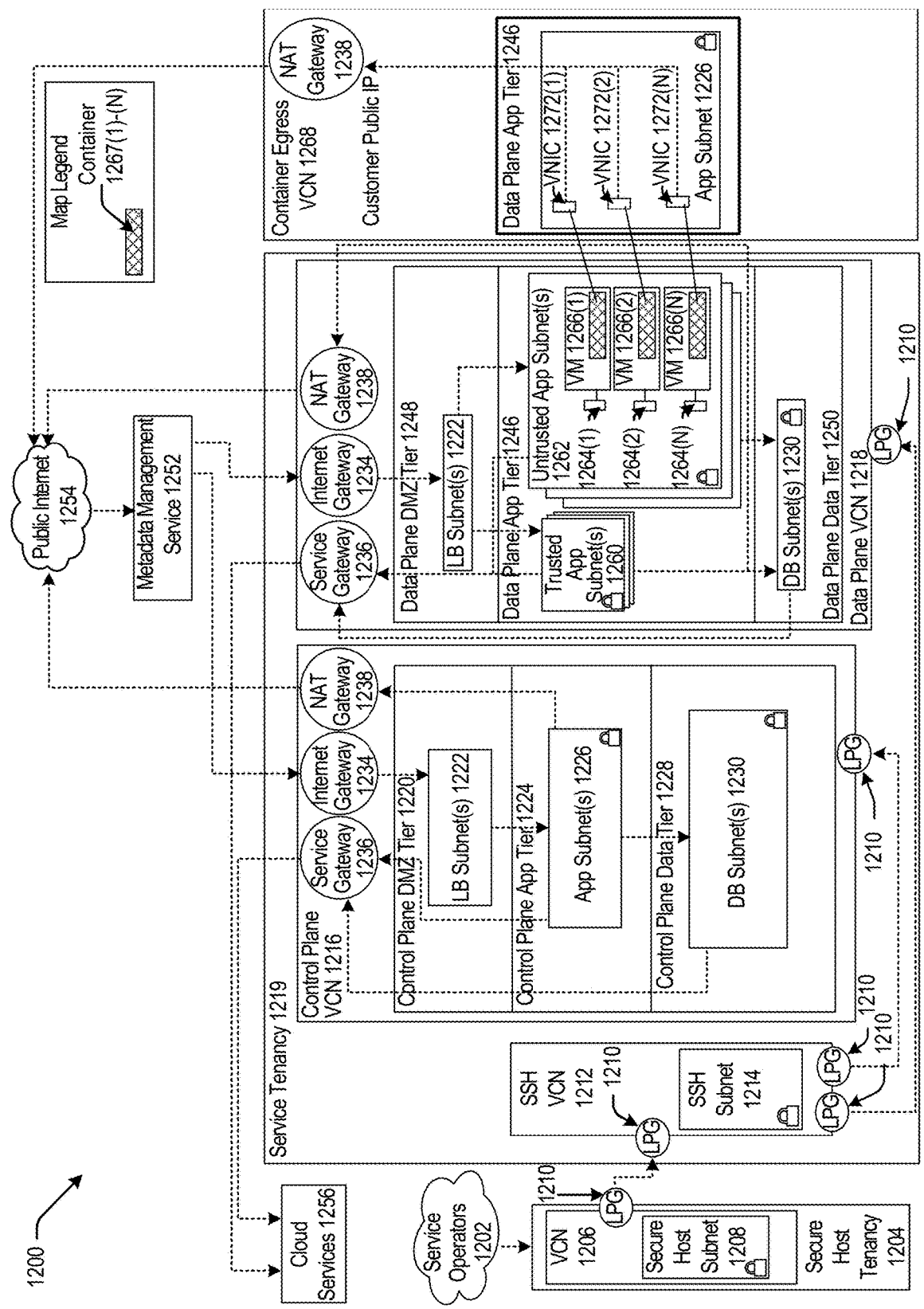
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN) 1206 (e.g. the VCN 906 of FIG. 9) and a secure host subnet 1208 (e.g. the secure host subnet 908 of FIG. 9). The VCN 1206 can include an LPG 1210 (e.g. the LPG 910 of FIG. 9) that can be communicatively coupled to an SSH VCN 1212 (e.g. the SSH VCN 912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g. the service tenancy 919 of FIG. 9).

The control plane VCN 1216 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g. the data plane app tier 946 of FIG. 9), a data plane DMZ tier 1248 (e.g. the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1160 of FIG. 11) and untrusted app subnet(s) 1262 (e.g. untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g. public Internet 954 of FIG. 9).

The Internet gateway 1234 contained in the control plane VCN 1216 and contained in the data plane VCN 1218 can be communicatively coupled to a metadata management service 1252 (e.g. the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively coupled to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
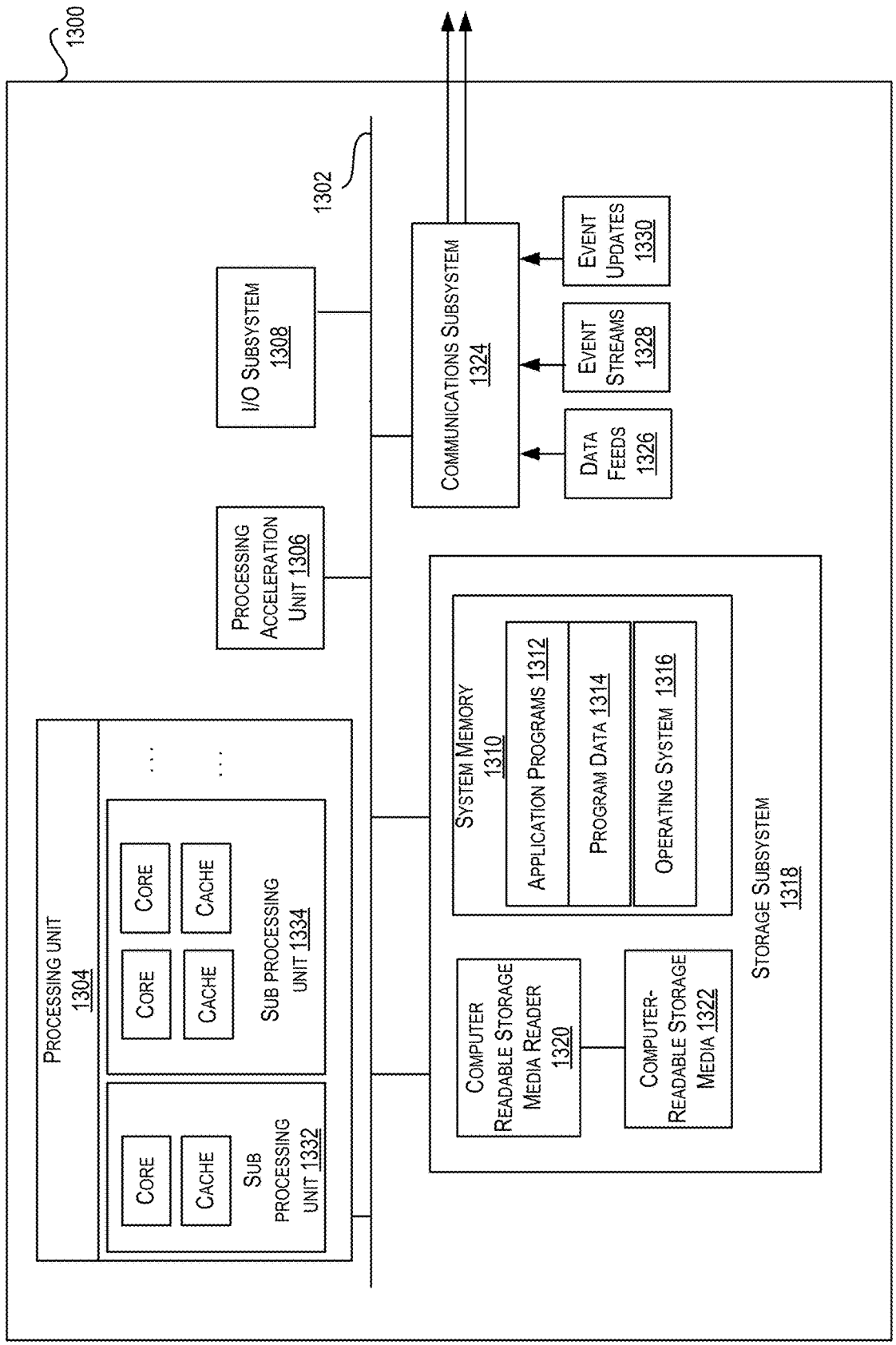
FIG. 13 is a block diagram illustrating an example computer system, according to at least one embodiment.

FIG. 13 illustrates an example computer system 1300, in which various embodiments may be implemented. The computer system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an input/output (I/O) subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the Institute of Electrical and Electronics Engineers (IEEE) P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processing unit 1304 and/or in storage subsystem 1318. Through suitable programming, processing unit 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1318 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc-read only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic Random Access Memory (DRAM)-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   assigning, a first fault domain to a first electrical zone of a data center comprising a first power supply and a second power supply configured to provide a first redundant electrical power supply for the first electrical zone,
      wherein the first fault domain comprises a first virtual location for distributing a first compute instance;
      wherein based on assigning the first fault domain to the first electrical zone, the first compute instance executes on a first set of hardware components that share a first single point of failure with respect to the first electrical zone;
   detecting, via an event stream, an event associated with a power sensor indicative of a power outage of the first power supply corresponding to the first electrical zone of the data center, wherein the power outage of the first power supply renders the first electrical zone unprotected by electrical power supply redundancy;
   determining, based at least on a fault domain configuration for the data center indicating that the first fault domain is assigned to the first electrical zone, that the power outage of the first power supply renders the first fault domain unprotected by electrical power supply redundancy; and
   based at least on the power outage rendering the first fault domain unprotected by electrical power supply redundancy, assigning the first fault domain to a second electrical zone of the data center, wherein the second electrical zone provides a second redundant electrical power supply to the first fault domain,
      wherein based on assigning the first fault domain to the second electrical zone, the first compute instance executes on a second set of hardware components that receive the second redundant electrical power supply of the second electrical zone.

2. The method of claim 1, wherein the data center receives electrical power from a first power distribution group and a second power distribution group, wherein the first power distribution group comprises the first power supply and the second power supply, and wherein the first electrical zone is configured to receive electrical power from the first power distribution group and the second power distribution group.

3. The method of claim 1, further comprising:
determining that a second fault domain assigned to a third electrical zone of the data center is protected by electrical power supply redundancy during the power outage of the first power supply,
  wherein the second fault domain comprises a second virtual location for distributing a second compute instance,
  wherein based on the second fault domain being assigned to the third electrical zone, the second compute instance executes on a third set of hardware components that share a second single point of failure with respect to the third electrical zone;
  wherein the power outage of the first power supply occurs without impacting the third electrical zone;
generating, for display on a display device, a visual representation indicating that the second compute instance is protected by electrical power supply redundancy during the power outage of the first power supply.

4. The method of claim 1, further comprising:
determining that the power outage of the first power supply renders a compute instance executing on the first fault domain unprotected by electrical power supply redundancy;
selecting a second fault domain that is protected by electrical power supply redundancy during the power outage of the first power supply;
distributing the compute instance in the second fault domain.

5. The method of claim 4, further comprising:
determining, prior to a maintenance event, that the maintenance event comprises the power outage of the first power supply;
assigning the first fault domain to the second electrical zone of the data center prior to the maintenance event.

6. The method of claim 4, wherein the first power supply comprises a first power leg configured to supply electrical power to the first electrical zone, wherein the first power leg comprises a first electrical path and a second electrical path, wherein the power outage is associated with the first electrical path.

7. The method of claim 4, wherein the first power supply comprises a first uninterrupted power supply and a second uninterrupted power supply, wherein the power outage is associated with a first electrical path comprising the first uninterrupted power supply.

8. One or more non-transitory computer-readable media comprising instructions that, when executed by one or more hardware processors, cause performance of operations comprising:
assigning a first fault domain to a first electrical zone of a data center comprising a first power supply and a second power supply configured to provide a first redundant electrical power supply for the first electrical zone,
  wherein the first fault domain comprises a first virtual location for distributing a first compute instance;
  wherein based on assigning the first fault domain to the first electrical zone, the first compute instance executes on a first set of hardware components that share a first single point of failure with respect to the first electrical zone;
detecting, via an event stream, an event associated with a power sensor indicative of a power outage of the first power supply corresponding to the first electrical zone of the data center, wherein the power outage of the first power supply renders the first electrical zone unprotected by electrical power supply redundancy;
determining, based at least on a fault domain configuration for the data center indicating that the first fault domain is assigned to the first electrical zone, that the power outage of the first power supply renders the first fault domain unprotected by electrical power supply redundancy; and
based at least on the power outage rendering the first fault domain unprotected by electrical power supply redundancy, assigning the first fault domain to a second electrical zone of the data center, wherein the second electrical zone provides a second redundant electrical power supply to the first fault domain,
  wherein based on assigning the first fault domain to the second electrical zone, the first compute instance executes on a second set of hardware components that receive the second redundant electrical power supply of the second electrical zone.

9. The one or more non-transitory computer-readable media of claim 8, wherein the data center receives electrical power from a first power distribution group and a second power distribution group, wherein the first power distribution group comprises the first power supply and the second power supply, and wherein the first electrical zone is configured to receive electrical power from the first power distribution group and the second power distribution group.

10. The one or more non-transitory computer-readable media of claim 8, wherein the operations further comprise:
determining that a second fault domain assigned to a third electrical zone of the data center is protected by electrical power supply redundancy during the power outage of the first power supply,
  wherein the second fault domain comprises a second virtual location for distributing a second compute instance,
  wherein based on the second fault domain being assigned to the third electrical zone, the second compute instance executes on a third set of hardware components that share a second single point of failure with respect to the third electrical zone;
  wherein the power outage of the first power supply occurs without impacting the third electrical zone;
generating, for display on a display device, a visual representation indicating that the second compute instance is protected by electrical power supply redundancy during the power outage of the first power supply.

11. The one or more non-transitory computer-readable media of claim 8, wherein the operations further comprise:
determining that the power outage of the first power supply renders a compute instance executing on the first fault domain unprotected by electrical power supply redundancy;
selecting a second fault domain that is protected by electrical power supply redundancy during the power outage of the first power supply;
distributing the compute instance in the second fault domain.

12. The one or more non-transitory computer-readable media of claim 11, wherein the operations further comprise:
determining, prior to a maintenance event, that the maintenance event comprises the power outage of the first power supply;
assigning the first fault domain to the second electrical zone of the data center prior to the maintenance event.

13. The one or more non-transitory computer-readable media of claim 8, wherein the first power supply comprises a first power leg configured to supply electrical power to the first electrical zone, wherein the first power leg comprises a first electrical path and a second electrical path, wherein the power outage is associated with the first electrical path.

14. The one or more non-transitory computer-readable media of claim 8, wherein the first power supply comprises a first uninterrupted power supply and a second uninterrupted power supply, wherein the power outage is associated with a first electrical path comprising the first uninterrupted power supply.

15. A system, comprising:
at least one device including a hardware processor;
the system being configured to perform operations comprising:
assigning a first fault domain to a first electrical zone of a data center comprising a first power supply and a second power supply configured to provide a first redundant electrical power supply for the first electrical zone,
wherein the first fault domain comprises a first virtual location for distributing a first compute instance;
wherein based on assigning the first fault domain to the first electrical zone, the first compute instance executes on a first set of hardware components that share a first single point of failure with respect to the first electrical zone;
detecting, via an event stream, an event associated with a power sensor indicative of a power outage of the first power supply corresponding to the first electrical zone of the data center, wherein the power outage of the first power supply renders the first electrical zone unprotected by electrical power supply redundancy;
determining, based at least on a fault domain configuration for the data center indicating that the first fault domain is assigned to the first electrical zone, that the power outage of the first power supply renders the first fault domain unprotected by electrical power supply redundancy; and
based at least on the power outage rendering the first fault domain unprotected by electrical power supply redundancy, assigning the first fault domain to a second electrical zone of the data center, wherein the second electrical zone provides a second redundant electrical power supply to the first fault domain,
wherein based on assigning the first fault domain to the second electrical zone, the first compute instance executes on a second set of hardware components that receive the second redundant electrical power supply of the second electrical zone.

16. The system of claim 15, wherein the data center receives electrical power from a first power distribution group and a second power distribution group, wherein the first power distribution group comprises the first power supply and the second power supply, and wherein the first electrical zone is configured to receive electrical power from the first power distribution group and the second power distribution group.

17. The system of claim 15, wherein the operations further comprise:
determining that a second fault domain assigned to a third electrical zone of the data center is protected by electrical power supply redundancy during the power outage of the first power supply,
wherein the second fault domain comprises a second virtual location for distributing a second compute instance,
wherein based on the second fault domain being assigned to the third electrical zone, the second compute instance executes on a third set of hardware components that share a second single point of failure with respect to the third electrical zone;
wherein the power outage of the first power supply occurs without impacting the third electrical zone;
generating, for display on a display device, a visual representation indicating that the second compute instance is protected by electrical power supply redundancy during the power outage of the first power supply.

18. The system of claim 15, wherein the operations further comprise:
determining that the power outage of the first power supply renders a compute instance executing on the first fault domain unprotected by electrical power supply redundancy;
selecting a second fault domain that is protected by electrical power supply redundancy during the power outage of the first power supply;
distributing the compute instance in the second fault domain.

19. The system of claim 18, wherein the operations further comprise:
determining, prior to a maintenance event, that the maintenance event comprises the power outage of the first power supply;
assigning the first fault domain to the second electrical zone of the data center prior to the maintenance event.

20. The system of claim 15, wherein the first power supply comprises a first power leg configured to supply electrical power to the first electrical zone, wherein the first power leg comprises a first electrical path and a second electrical path, wherein the power outage is associated with the first electrical path.

21. The system of claim 15, wherein the operations further comprise:
prior to assigning the first fault domain to the second electrical zone of the data center:
generating, for display on a display device, a first visual representation indicating that the first fault domain is unprotected by electrical power supply redundancy.

22. The system of claim 15, wherein the power outage comprises a power failure.

23. The system of claim 15, further comprising:
prior to detecting the event associated with the power sensor indicative of the power outage of the first power supply:
generating a first fault domain configuration for the data center comprising a first indication that the first fault domain is assigned to the first electrical zone of the data center;
subsequent to assigning the first fault domain to the second electrical zone of the data center:
updating the first fault domain configuration with a second fault domain configuration for the data center comprising a second indication that the first fault domain is assigned to the second electrical zone of the data center.

24. The system of claim 15, further comprising:
determining the second electrical zone based on the fault domain configuration of the data center.

25. The system of claim 15, further comprising:
accessing the fault domain configuration for the data center, wherein the fault domain configuration for the data center comprises a plurality of virtual locations, including the first virtual location, of one or more fault domains, including the first fault domain, for distributing one or more compute instances.

26. The system of claim 15, wherein the fault domain configuration for the data center comprises a failover matrix, the failover matrix indicating that the first electrical zone is unprotected by electrical power supply redundancy and that that second electrical zone is protected by electrical power supply redundancy.

* * * * *